United States Patent Office 3,150,989
Patented Sept. 29, 1964

3,150,989
LIGHTWEIGHT REFRACTORY AGGREGATE AND PROCESS FOR MAKING SAME
Joseph R. Parsons, Park Forest, Ill., assignor to Chicago Fire Brick Company, Chicago, Ill., a corporation of Illinois
No Drawing. Filed Apr. 23, 1962, Ser. No. 189,282
26 Claims. (Cl. 106—40)

The present invention relates to a lightweight refractory material for refractory furnaces and the like, and more particularly to a porous ceramic aggregate for the manufacture of insulating brick. It includes the process for forming the lightweight aggregate and for forming the bricks or similar articles.

Conventional insulating refractory bodies generally involve a composition containing a mixture of a refractory material or plastic clay-grog mix and an organic burnout material which, when subjected to elevated temperatures, the organic material is decomposed to develop porosity and a low bulk density. Porosity is also developed in suitable materials through the chemical behavior of the materials involved.

A disadvantage of these prior compositions for and modes of forming the insulating brick is that the bricks, wedges, keys and arches have been cut from oversize dobies with a resultant waste of material up to 50%. The trimming operations are required since the material could not be accurately shaped and retain its shape upon subsequent firing. Other disadvantages of the prior refractory materials are extreme sensitivity to heat shock and poor spalling resistance, excessive shrinkage at elevated temperatures, and excessive weight of the finished product.

An important object of the present invention is the provision of a method of manufacturing the insulating refractory bricks and the like which will overcome the disadvantages cited above. This method includes a dry press or power press method of forming the product. To utilize the power press method, a lightweight grog is required of a sufficient strength for pressing.

Another object of the present invention is the provision of a porous ceramic aggregate or lightweight grog suitable for the manufacture of insulating brick and other products. It is preferred that the clays or non-plastic refractory particles are used in their natural state so that they have the lowest possible free energy under the prevailing physical and chemical conditions. Also, rather than using sawdust or other combustible material to provide the required porosity by burning out such combustible material, a stabilized foam is utilized to provide the porosity in the aggregate.

A further object of the present invention is the provision of a stabilized foam to provide the desired porosity in the aggregate. In the present invention, the stabilization of the foam is in no way dependent upon the chemical behavior of the refractories involved, beyond the necessity of solubility in an aqueous medium. Thus, refractory particles, such as kaolin, fire clay, kyanite, zircon or alumina, can be used to their maximum service temperatures without regard for their plasticity or chemical behavior. By utilizing the stabilized foam, other materials normally utilized to obtain similar results, such as sodium silicate, calcined gypsum, cement, flexing gels or other cementiceous materials, are eliminated.

The present invention comprehends the provision of an organic thermal gelling or gelation agent to stabilize the foam, which gelling or gelation agent can be completely destroyed in the burning process. These agents have the desirable and unusual property of being able to bring about a thermal set or to cause gelation of an aqueous solution containing them on heating at a relatively low temperature. One gelling agent which is preferred for use in forming a gel is a viscous methyl cellulose sold under the trade name of "Methocel." With proper control, this gelling agent can be combined with a number of other organic gelling agents such as starches, glues, dextrin and water-soluble gums. The methyl cellulose is formed into a gel solution or sol for addition to the foam.

The present invention also comprehends a stabilzed porous refractory aggregate which can be used in the manufacture of insulating shapes by the common operations of the stiff mud or soft mud processes as well as the power pressing process. The lightweight aggregate formed from this porous mass allows the variance of weight, strength and temperature range of the finished product without changing the process of manufacture.

Another aspect of the present invention comprehends the use of raw starch for a stabilizing and gelling agent which cooks or gels well below the boiling point of water, 165° F. and above. The present invention further comprehends the utilization of the raw starch in a very unusual manner, in that the raw starch is mixed with a clay slurry. Apparently this allows the clay or other refractory material to develop its linkage and later its ceramic bond independently of the starch. Starch, when once cooked or gelled, is bulky, and if cooked starch were used in the maximum quantities of this invention, the cooked starch when mixed into the clay slurry would destroy all bond of the clay. It is this unexpected compatibility between the raw starch and the clay slurry which allows excellent aggregates to be made.

The present invention also comprehends the use of an organic material which will tolerate the presence of acids or bases. By varying the pH of the foam solution to be gelled, the consistency of the foam and its density may be altered as desired. The starch thus works well under varying conditions without regard as to whether the clay or other slurry material is flocculated or deflocculated.

Further objects will become apparent to those skilled in the art upon consideration of the following description and as particularly defined by the accompanying claims.

The present invention is designed primarily to form lightweight refractory aggregates by the process of spreading the refractory particles into thin refractory films with the use of foam. In order to obtain optimum porosity and retain the desired structure of the material, it is necessary to set this material as soon as possible. To promote the setting characteristics of the foamed material, an organic gelling agent such as methyl cellulose is added to the foam. Methyl cellulose, with the proper chemicals added, and suitable viscosities, can be made to gel at relatively low temperatures. A preferable temperature used in the present invention is approximately 120° F. as this temperature provides excellent stabilization of the structure prior to any destructive movement which may occur when the foamed slurry reaches its boiling point during drying.

There are three known methods for introducing a foam into clay or other suitable refractory slurries. A first method encompasses the generation of the gas for the foam in the slurry with a carbonate in the presence of an acid or other suitable chemical means. This method is of limited utility due to the excessive agitation required to reduce the refractory film to a uniform structure to provide a substantially uniform aggregate. Satisfactory products can be obtained where weight reduction does not exceed 50 to 60%.

A second method of introducing foam in the slurry relates to the addition of a foaming agent to the refractory slurry and sufficient water to insure fluidity. The resulting mass is then beaten into a uniform foamed product. This method is found to give satisfactory results, but this method requires greater amounts of foaming agents and water than the preferred method following.

The third and preferred method of operation involved the generation of a strong stable foam separate from the refractory slurry, and then blending this foam with the thick slurry. For this method, a minimum quantity of foaming agent is required, and the blended slurry does not have to be reduced to a thin medium.

The strong stable foam is formed by using a foaming agent in water, where the foaming agent is an anionic surface active agent. Suitable foaming agents have been found for the present process to be any of the anionic surface active agents described in the literature, two of such agents being sold under the trademarks of "Duponol" and "Ultrawet 30 DS." "Duponol" is a mixture of fatty alcohol sulfates of between eight and eighteen carbon atoms. "Ultrawet 30 DS" is a 25.5% aqueous solution of an alkyl benzene sodium sulfonate.

To stabilize the foam, methyl cellulose is added to the foam and thoroughly dispersed therein.

Commercially obtained methyl cellulose will gel relatively near the boiling point of water. If gelling does not take place soon enough, steam created by the boiling of the water in the slurry will disrupt the desired foam structure of the slurry. To obtain a satisfactory stabilization using methyl cellulose in the foam structure, a number of additives may be utilized which will lower the gelling point. A low temperature gelling allows the foam structure to be locked in place in the slurry before the disruptive effects of the steam can occur. Such additives providing this effect are sodium chloride, magnesium chloride, aluminum sulfate, sodium phosphate, sucrose, sorbitol, propylene glycol and hexahydric alcohol. In all of the following examples the methyl cellulose for the 2% solution has a viscosity of 4000 centipoises.

*Example I*

This example illustrates the foaming and bonding of completely non-plastic refractory particles using the following ingredients:

| | Grams |
|---|---|
| Alumina (325 mesh) | 2000 |
| Methyl cellulose (2% solution) | 200 |
| Water | 150 |
| Sodium lauryl sulfate (foaming agent) | 5 |
| Hexahydric alcohol | 5 |

These ingredients were reduced to a slurry, whipped to a foam mass, and heated rapidly to above a temperature of 140° F. The hexahydric alcohol utilized in this example is an agent to lower the gelling point of the methyl cellulose. The methyl cellulose gels and locks the foam structure in place so that it can be fired in a suitable kiln to bonding temperature. This material when fired to a temperature of 3000° F. gave an aggregate having a weight of 44.0 pounds per cubic foot through 4 mesh on 20 mesh.

*Example II*

In this example, a mullite foam aggregate is produced with the foam being generated in situ.

| | Grams |
|---|---|
| Kaolin | 1200 |
| Alumina fines—325 mesh | 800 |
| 2% methyl cellulose solution | 300 |
| Water | 650 |
| Sodium silicate | 15 |
| 25.5% aqueous solution of sodium dodecyl benzene sulfonate | 4 |

The ingredients were mixed together to form a slurry and the foaming agent (Ultrawet 30 DS) added to generate a foam within the slurry. The foamed slurry had a weight of 33 pounds per cubic foot and when the slurry was gelled and then fired to 2910° F., the resulting aggregate had a weight of 22 pounds per cubic foot through 4 on 20 mesh. The temperature service range for this aggregate is 0 to 3200° F.

*Example III*

This example relates to a foamed alumina aggregate where the foam is generated separately.

Foam:
| | | |
|---|---|---|
| Water | cc | 200 |
| 25.5% of sodium dodecyl benzene sulfonate | grams | 4 |
| 2% methyl cellulose solution | do | 100 |

Slurry:
| | | |
|---|---|---|
| Alumina fines (325 mesh) | do | 2000 |
| 2% methyl cellulose solution | do | 300 |
| Water | do | 1000 |

The slurry and foam were mixed separately and then combined to form the desired structure. The methyl cellulose in the foam controls the structure and consistency of the foam while sufficient methyl cellulose is added to the slurry to provide for gelling of the slurry under heat. The density of the foamed slurry was determined to be 35 pounds per cubic foot. The slurry was then heated to gel the total methyl cellulose in the foamed slurry and fired to a temperature of 2910° F. The bulk density of the resulting aggregate through 4 on 20 mesh was found to be 25 pounds per cubic foot and the service range for the aggregate is 0–3400° F.

*Example IV*

This example illustrates a zircon foamed aggregate with the foam generated in situ.

| | Grams |
|---|---|
| Zircon flour (200 mesh or fines) | 2000 |
| 2% methyl cellulose solution | 300 |
| Water | 300 |
| Sodium dodecyl benzene sulfonate (25.5% solution) | 4 |

The above ingredients were mixed together with the water being in sufficient quantity to provide a suitable foam. The density of the foamed slurry was found to be 50 pounds per cubic foot. The slurry was heated to gel the slurry and then rapidly heated to 2910° F. to fire the material. The bulk density of the resulting aggregate is 35 pounds per cubic foot and the service range is approximately 0–4000° F. This aggregate should be fired high for top service range temperatures.

*Example V*

Foam:
| | | |
|---|---|---|
| 2% methyl cellulose solution | grams | 100 |
| Water | cc | 200 |
| Sodium dodecyl benzene sulfonate (25.5% solution) | grams | 4 |

Slurry:
| | | |
|---|---|---|
| Kaolin | do | 2000 |
| Water | do | 1800 |
| 2% methyl cellulose solution | do | 300 |
| Aluminum sulfate | do | 10 |

This example illustrates the present method of stabilizing the foam used with a flocculated material. The aluminum sulfate, like the hexahydric alchohol of Example I, lowers the gelling point of the methyl cellulose to prevent disruption of the slurry as higher temperatures are reached. The separate foam and slurry, after formation, were mixed, gelled and fired as disclosed in previous examples. The density of the foamed slurry was 38 pounds per cubic foot.

*Example VI*

Foam:
| | Grams |
|---|---|
| 2% methyl cellulose solution | 100 |
| Water | 200 |
| Sodium dodecyl benzene sulfontae (25.5% solution) | 4 |

Slurry:
| | |
|---|---|
| Kaolin | 2000 |
| Water | 800 |
| 2% methyl cellulose solution | 300 |
| Sodium silicate | 25 |

The procedure followed is the same as in Example V. This example utilizes a deflocculated material and from comparison with Example V, the deflocculated material requires considerably less water in the slurry. Considerably more water is required in a slurry on the acid side. The sodium silicate in this example is a deflocculating agent for the kaolin. The density of the foamed slurry is 35 pounds per cubic foot. This example also produces a satisfactory lightweight aggregate upon firing.

There appears to be no well defined upper limit for the use of methyl cellulose in this process except for considerations of cost and the extreme stiffness of the foams generated. The foam structures become finer as the foam is locked in place with excessive amounts of the methyl cellulose gel. For practical purposes, the maximum limit using methyl cellulose having a viscosity of 4000 cps. is 24 to 40 pounds per ton of clay on the deflocculated side and 40 to 70 pounds per ton on the flocculated side appears to give satisfactory results. The minimum amount of methyl cellulose required for satisfactory results is approximately 4 pounds per ton of clay, but in this minimum range the foam is very sensitive to collapse, more foaming agent is required and the low weights of the fired aggregate are difficult to obtain. The following examples illustrate the maximum and minimum limits of methyl cellulose as a stabilizing agent.

*Example VII*

| | Grams |
|---|---|
| Kaolin | 2000 |
| 2% methyl cellulose solution | 1600 |
| Sodium dodecyl benzene sulfonate (25.5% solution) | 4 |
| Sodium silicate | 25 |

This example discloses a maximum quantity used with deflocculated kaolin. The density of the foamed slurry is 28 pounds per cubic foot. A satisfactory aggregate was obtained from the firing of this slurry. In this example and the three examples following, the foam was generated in the slurry.

*Example VIII*

| | Grams |
|---|---|
| Kaolin | 2000 |
| 2% methyl cellulose solution | 2600 |
| Sodium dodecyl benzene sulfonate (25.5% solution) | 4 |
| Aluminum sulfate | 10 |

This example utilizes the maximum amount of methyl cellulose with a flocculated clay to obtain a satisfactory product. It should be noted that there is a substantial increase in the amount of methyl cellulose required where a flocculated rather than a deflocculated clay is used. Further, no water is noted in Examples VII and VIII as the 2% aqueous solution of methyl cellulose provides sufficient water for the slurry. The density of the foamed slurry is 27 pounds per cubic foot.

*Example IX*

| | Grams |
|---|---|
| Kaolin | 2000 |
| 2% methyl cellulose solution | 200 |
| Water | 1000 |
| Sodium silicate | 25 |
| Sodium dodecyl benzene sulfonate (25.5% solution) | 8 |

This example illustrates the minimum amount of methyl cellulose used with a deflocculated clay. The density of the foamed slurry is 42 pounds per cubic foot.

*Example X*

| | Grams |
|---|---|
| Kaolin | 2000 |
| 2% methyl cellulose solution | 200 |
| Water | 1800 |
| Sodium dodecyl benzene sulfonate (25.5% solution) | 12 |

This last example illustrates a minimum amount of methyl cellulose with a flocculated clay. The water required for a suitable slurry is substantially increased and, to prevent collapse of the foam structure in this example and Example IX, the amount of foaming agent has been increased. The density of this foamed slurry is 38 pounds per cubic foot. This example as well as Examples V through IX produce satisfactory aggregates when fired to 2400° F.

Another gelling agent utilized to promote the setting characteristics of the foamed material, is raw starch which is added directly to the slurry. Raw starch cooks or gels in the presence of water well below the boiling point of water; at approximately 165° F.

One of the outstanding advantages of the use of raw starch to form the gel is that it will tolerate the presence of acids or bases. In view of this advantage, the chemical properties of the refractory slurry may be utilized. For instance, the use of a starch gelling agent with a kaolin slurry will provide a very fine foam on the basic side, while the same slurry and foam formation will give a much larger foam structure on the acid side which is also somewhat heavier. This can be understood from the fact that a clay forms thicker walls in an acid medium or flocculated condition.

Starches gel at a relatively high temperature and thus require rapid heating to insure proper gelatinization of the slurry so the desired foam structure will be retained. Fast heating is generally required to the boiling point, but the slurry may be fired extremely rapidly if desired. The following examples illustrate the utilization of uncooked or raw starch in a refractory slurry.

*Example XI*

| | Grams |
|---|---|
| Kaolin | 1000 |
| Water | 325 |
| Sodium lauryl sulfate (foaming agent) | 5 |
| Raw starch | 50 |
| Sodium silicate | 7 |

Here a raw starch is used to set the foam structure taking advantage of the starch's compatibility with basic solutions which are capable of deflocculating the clay slurry. The ingredients were mixed to a thin slurry and foamed. When this mixture was fired to 2550° F. and crushed through 4 mesh on 20 mesh, a lightweight aggregate weighing 10 pounds per cubic foot was obtained.

The sodium silicate acts as a deflocculating agent for the clay slurry. Other suitable deflocculating agents include sodium carbonate and trisodium phosphate.

*Example XII*

| | Grams |
|---|---|
| Kaolin | 1000 |
| Water | 900 |
| Sodium lauryl sulfate (foaming agent) | 5 |
| Raw starch | 50 |

This is approximately the same formula as Example XI except that the sodium silicate is eliminated and 475 grams of additional water are required. These ingredients are mixed together in a slurry and foamed. When fired to 2500° F., a lightweight aggregate was produced weighing 15 pounds per cubic foot through 4 mesh on 20 mesh.

*Example XIII*

| | | |
|---|---|---|
| Kaolin | grams | 1200 |
| Alumina (fine 325 mesh) | do | 800 |
| Sodium silicate | do | 15 |
| Sodium dodecyl benzene sulfonate (25.5% solution) | do | 6 |
| Thick boiling starch (raw) | do | 60 |
| Water | cc | 775 |

This example relates to a mullite foam aggregate. The ingredients are added together and agitated to provide the foam, with the starch being added to the foamed slurry. This slurry has a density of 48 pounds per cubic foot. The slurry is gelled and fired to a temperature of 2910° F. and the bulk density of the fired aggregate through 4 on 20 mesh was 20 pounds per cubic foot. Upon firing this aggregate, a very low shrinkage results with the service range of the aggregate in the range of 0–3200° F.

*Example XIV*

| | |
|---|---:|
| Kyanite (100 mesh raw) _____grams__ | 1800 |
| Bentonite _____do____ | 200 |
| Thick boiling starch (raw) _____do____ | 80 |
| Sodium dodecyl benzene sulfonate (25.5% solution) _____do____ | 12 |
| Water _____cc__ | 1500 |

A kyanite foam aggregate is formed in this example with the procedure for forming the foam slurry substantially as previously described. The weight of the foam slurry was determined to be 52 pounds per cubic foot. When fired to 2910° F., the bulk density of the resulting aggregate was 34 pounds per cubic foot through 4 on 20 mesh and the service range was 0–3200° F.

*Example XV*

| | |
|---|---:|
| Alumina (325 mesh) _____grams__ | 1900 |
| Bentonite _____do____ | 100 |
| Sodium dodecyl benzene sulfonate (25.5% solution _____do____ | 12 |
| Thick boiling starch (raw) _____do____ | 80 |
| Water _____cc__ | 1500 |

The alumina foam aggregate formed in this example is foamed and gelled in the manner disclosed in previous examples. The weight of the foam slurry was 45 pounds per cubic foot and, when fired to 2910° F., the resulting aggregate through 4 on 20 mesh had a bulk density of 33 pounds per cubic foot and a service range of 0–3400° F. The bentonite utilized in the above example and in Example XIV is utilized primarily as a flux to develop bond.

*Example XVI*

| | |
|---|---:|
| Zircon flour (200 mesh or finer) _____grams__ | 2000 |
| Sodium dodecyl benzene sulfonate (25.5% solution) _____grams__ | 12 |
| Thick boiling starch (raw) _____do____ | 80 |
| Water _____cc__ | 400 |

This zircon foam aggregate is also formed and gelled in the previously described manner. The foam slurry has a density of 55 pounds per cubic foot and, when fired at 2910° F., the bulk density is 34 pounds per cubic foot. If the slurry is fired to a higher temperature, a service range of 0–4000° F. can be obtained.

Excellent bond was obtained in Example XVI due to the slight impurities in the zircon so that no plastic material was required. These six examples illustrate the versatility of the disclosed process of manufacture producing special high temperature cellular aggregates.

To obtain satisfactory locking of the foam in the clay or other refractory material structure utilizing raw thick boiling starch, the foamed clay slurry must be heated rapidly to approximately 165° F. Using a deflocculated clay, the minimum starch requirement is 2½ to 3% based on the weight of the clay in the slurry. However, the minimum amount, even on fast drying, results in a marked center collapse of the foam structure. On the natural or flocculated side where the clay is more stable, as little as 2% raw starch will satisfactorily stabilize the foam structure.

The maximum amount of raw starch utilized in this process appears to be unlimited as the clay and starch bonds do not seem to interfere with one another during dry bonding or firing. This is contrary to experiments where other organic combustibles are used with clay to obtain lightness. Usually where excessive amounts of sawdust are added to a plastic clay mass, complete destruction of the bond between the clay particles follows. The present process has produced satisfactory aggregate on the deflocculated and natural sides containing up to seventy-five percent raw starch with a resulting satisfactory ceramic bond and compatibility. The limits shown in the following examples provide possible commercial limits for this process, although I do not wish to preclude from use the very special aggregates that can be made by high contents of starch disclosed by this invention:

*Example XVII*

| | Grams |
|---|---:|
| Kaolin _____ | 1600 |
| Sodium dodecyl benzene sulfonate (25.5% solution) _____ | 12 |
| Thick boiling starch (raw) _____ | 400 |
| Sodium silicate _____ | 20 |
| Water _____ | 1100 |

This example utilizes a deflocculated clay utilizing sodium silicate as a deflocculating agent. The percentage of starch based on the clay in the slurry is 22%. The foam is generated within the slurry and the starch is then added directly thereto. The weight of the foamed slurry was 40 pounds per cubic foot and when the slurry was gelled and fired to 2400° F. a satisfactory aggregate resulted.

*Example XVIII*

| | Grams |
|---|---:|
| Kaolin _____ | 1600 |
| Sodium dodecyl benzene sulfonate (25.5% solution) _____ | 10 |
| Thick boiling starch (raw) _____ | 400 |
| Aluminum sulfate _____ | 10 |
| Water _____ | 1800 |

The clay slurry is in a flocculated state and the small amount of aluminum sulfate added to the slurry helps to preserve the flocculated condition. Again the foam was generated in the slurry and the raw starch added thereto. A satisfactory lightweight aggregate resulted from the gelling and firing of this slurry to at least 2400° F. The density of the foamed slurry was 33 pounds per cubic foot and the starch was present in an amount of 22% based on the clay in the slurry.

*Example XIX*

Slurry:

| | |
|---|---:|
| Kaolin _____grams__ | 2000 |
| Thick boiling starch _____do____ | 60 |
| Sodium silicate _____do____ | 25 |
| Water _____cc__ | 875 |

Foam:

| | |
|---|---:|
| 1% cooked thick boiling starch ____grams__ | 200 |
| Sodium dodecyl benzene sulfonate (25.5% solution) _____grams__ | 4 |

This example illustrates a process utilizing a minimum amount of raw starch where the foam is separately generated. The slurry is formed using a deflocculated clay and sodium silicate is utilized as a deflocculating agent. The foam is separately generated with a small amount of raw starch added thereto to stabilize the foam prior to addition to the slurry. The foam is mixed into the slurry after the major quantity of starch has been added to the slurry. The slurry is quickly gelled and fired to approximately 2900° F. to obtain a satisfactory aggregate. The density of the foamed slurry was 31 pounds per cubic foot, and 3% starch was utilized based on the clay in the slurry.

Example XX

Slurry:
- Kaolin _____ grams__ 2000
- Thick boiling starch _____ do____ 40
- Aluminum sulfate _____ do____ 10
- Water _____ cc__ 1800

Foam:
- 1% cooked thick boiling starch ____ grams__ 200
- Sodium dodecyl benzene sulfonate (25.5% solution) _____ grams__ 6

This example utilizes a flocculated clay slurry with aluminum sulfate added to insure the presence of the flocculate state. The foamed slurry is formed, gelled and fired in a similar manner to obtain a satisfactory product. The weight of the foamed slurry was 37 pounds per cubic foot and the starch was present in an amount of 2% based on the clay in the slurry.

Example XXI

|  | Grams |
|---|---|
| Kaolin | 1600 |
| Sodium dodecyl benzene sulfonate (25.5% solution) | 12 |
| Thick boiling starch | 400 |
| Sodium silicate | 20 |
| Water | 1100 |

This formula utilizing kaolin in a defloccoulated state with sodium silicate as a deflocculating agent was mixed and the foam generated in the slurry. Gelling and firing was performed in the manner disclosed in previous examples to produce an aggregate having a bulk density of 8 pounds per cubic foot through 4 mesh on 20 mesh screen. The same formula was used where the water and raw starch were cooked together first prior to mixing and foaming in the slurry. The result was a stiff plastic mass without foam structure and when fired had many cracks and little bond. The resulting aggregate had a density of 35 pounds per cubic foot through 4 mesh on 20 mesh screen and was considered unsatisfactory.

With these new insulating aggregates as produced by any one of the above examples, substantially any desired shape can now be reproduced on a power press. Also, these aggregates allow operation under the stiff mud and soft mud processes, as the very lightweight aggregate is substituted for the usual grog or flint added to a regular fire brick manufacture.

Although any one of the three above methods of manufacture can be utilized with the lightweight aggregate, the power press method is preferred as the finished product can be made to size. The large quantity of lightweight aggregate used produces a product of minimum shrinkage on manufacture which can be packaged or sold without further processing.

The following table discloses the range of the cellular or porous lightweight aggregate formulae for the manufacture of insulating brick.

TABLE I

|  | Percent |
|---|---|
| Coarse cellular aggregate (⅜ or ¼ inch to 10 mesh) | 0 to 60 |
| Fine cellular aggregate (10 mesh and fines) | 10 to 60 |
| Raw binding clays | 20 to 70 |
| Bulking agents | 0 to 25 |

In the manufacture of the dry pressed or power pressed insulating brick, it has been found that the bulking volume of the prepared cellular aggregate is very important in obtaining proper press behavior. It appears necessary to obtain the maximum die travel to insure strong edges and corners for the insulating brick. For example, a cellular aggregate through 4 mesh on 10 mesh will weigh 16 pounds per cubic foot, while the same aggregate through 20 mesh on 28 mesh will weigh 23 pounds per cubic foot.

There is occasionally a need for the addition of bulking agents to provide maximum bulking for the cellular clay aggregate used in power pressing, and the presence of such bulking agents does not materially interfere with the spalling resistance or other properties of the finished product. It is not absolutely necessary to use bulking agents in the pressing of the refractory insulating brick and such bulking agents are generally used for large volume objects or where a longer press travel is required. Such bulking agents include diatomaceous earth, perlite, carbon, coke, asbestos fiber, vermiculite and similar low density materials; the agents being used singly or in combinations.

In producing the refractory insulating grog for pressing, a bonding agent is necessary to bind the lightweight aggregate together and provide a point contact bond under pressure. The bonding agents include bonding clays such as kaolin, fire clays, ball clays, and wad and sagger clays. Occasionally small amounts of bentonite will improve the bonding qualities of the grog.

In the present process, the clay bonding agent is required to bond the insulating brick, as the structural stability and service limit of the brick are obtained from the pre-fired stabilized insulating refractory grog (aggregate). The following examples relate to the pressing of the final shaped bricks.

Example XXII

|  | Percent |
|---|---|
| Foam aggregate (¼ inch on 10 mesh) | 42 |
| Foam aggregate (10 mesh and fines) | 14 |
| Bond clay (raw kaolin) | 33 |
| Bulking agent | 11 |
| Water content | 14 to 24 |

This brick was power pressed in a pressure range of 42 to 79 pounds per square inch to a standard 9″ x 4½″ x 2½″ size brick and fired to cone 14. The brick upon firing to cone 14 showed only 2% total shrinkage. The water content is based on the weight of the pressing mixture.

Example XXIII

|  | Percent |
|---|---|
| Foam aggregate (6 mesh and fines) | 47 |
| Raw kaolin | 47 |
| Perlite | 6 |
| Water content | 8 to 32 |

This mixture was pressed in a range of 28 to 148 pounds per square inch and fired. The resulting brick was found to be satisfactory and was comparable in shrinkage to the brick of Example XXII.

Example XXIV

|  | Percent |
|---|---|
| Foam aggregate (8 mesh and fines) | 46 |
| Raw kaolin | 46 |
| Perlite | 8 |
| Water content | 15 to 20 |

The pressure range for this mixture was found to be 28 to 48 pounds per square inch to provide a satisfactory brick. The pressed mixture was suitably fired to give a lightweight refractory brick.

Example XXV

|  | Percent |
|---|---|
| Foam aggregate | 56 |
| Bonding clay (raw kaolin) | 28 |
| Bulking agent (perlite) | 16 |
| Water content | 15 |

This mixture was power pressed and fired to cone 14. The pressure range to provide a satisfactory product was 110 to 141 pounds per square inch. At this firing, the brick showed only 2% shrinkage. When tested for service by reheating to 2800° F., the brick developed only 1% shrinkage.

The brick of the preceding four examples has excellent spall resistance while the presently known insulating refractory brick have poor spall resistance, since where thin walls of plastic clay are fired to a semi-vitreous or vitreous state to obtain commercial strength, they are very very sensitive to heat shock and tend to crack easily. The present invention overcomes this weakness by combining a coarse, stable, pre-fired insulating aggregate or grog with a plastic clay of substantially finer particle size than the pre-fired aggregate and power pressing the mixture. The clay is —100 mesh which is substantially finer than even the fines of the pre-fired aggregate. When this brick is fired, the firing is only to provide bonding in the brick. This firing gives two distinct glassy phases in the finished product, one glassy phase being the bond of the pre-fired aggregate, and the other being the glassy bond of the bonding clay. It is desired that the aggregate or grog and the clay have slightly different bonding behavior so that when heat shock develops, a continuous break cannot develop through both the aggregate and the bond. Where a crack develops in the bond, it travels until it meets a piece of coarse aggregate and the crack can go no further and stops.

It has also been found that the refractory insulating aggregates of this invention can be given improved stability above their original firing temperature so as to decrease the amount of undesirable shrinkage by the addition of specific elements or compounds such as sulfur, sodium fluoride and calcium fluoride. These additives will improve the shrinkage characteristics of the clay over a wide range of temperatures to 3000° F.

Having thus disclosed my invention, I claim:

1. The process of forming a lightweight refractory aggregate consisting of the steps of forming an aqueous slurry of a refractory material from the group consisting of kaolin, kyanite, zircon flour and alumina, adding a foam to the slurry containing an anionic surface active agent, adding a thermal gelling agent from the group consisting of methyl cellulose and raw starch to the slurry, heating to gel the slurry and firing the gelled slurry.

2. The process of forming a lightweight refractory aggregate consisting of the steps of forming an aqueous slurry of kaolin, foaming said slurry with the addition of a surface active agent, adding methyl cellulose as a thermal gelling agent to the foamed slurry, heating said slurry to gel the methyl cellulose and the slurry, and firing the gelled slurry to a temperature of at least 2400° F.

3. The process of forming a lightweight refractory aggregate consisting of the steps of forming an aqueous slurry of kaolin, separately generating a foam from a surface active agent in water, adding methyl cellulose to the foam, mixing the foam with the aqueous slurry, heating the slurry, and firing the resultant gelled mass; the methyl cellulose being added to the foam in an amount of from 4 to 70 pounds of methyl cellulose per ton of clay.

4. The process of forming a lightweight refractory aggregate consisting of the steps of forming an aqueous slurry of deflocculated clay, generating foam within the slurry through the addition of an anionic surface active agent, adding methyl cellulose to the slurry in the range of 4 to 40 pounds per ton of clay, rapidly heating the foamed slurry to gel said slurry, and firing the gelled slurry to a temperature of 2400 to 3000° F.

5. The process of forming a lightweight refractory aggregate consisting of the steps of forming an aqueous slurry of flocculated clay, generating a foam within the slurry by the admixture of a surface active agent therein, adding methyl cellulose to the slurry in the range of 4 to 70 pounds per ton of clay, rapidly heating the foamed slurry to gel said slurry, and firing the gelled slurry to a temperature of at least 2400° F.

6. The process of forming a lightweight refractory aggregate as set forth in claim 5, including the addition of an additive selected from the group consisting of sodium chloride, magnesium chloride, aluminum sulfate, sodium phosphate, sucrose, sorbitol, propylene glycol and hexahydric alcohol to lower the gelling temperature of the methyl cellulose.

7. The process of forming a lightweight refractory aggregate consisting of the steps of forming an aqueous slurry of zircon flour, generating a foam within the slurry by adding a surface active agent and agitating the slurry, adding methyl cellulose in the amount of approximately 6 pounds of methyl cellulose per ton of zircon flour, gelling the slurry by heat, and firing the slurry to a temperature of approximately 2900° F.

8. The process of forming a lightweight refractory aggregate consisting of the steps of forming an aqueous slurry of alumina, generating a foam within the slurry by adding an anionic surface active agent to the slurry and agitating, adding methyl cellulose to the slurry in an amount of approximately 10 pounds per ton of alumina, gelling the slurry by gelling the methyl cellulose with heat, and firing the gelled slurry to a temperature of approximately 3000° F.

9. The process of forming a lightweight refractory aggregate as set forth in claim 8, in which kaolin is added to the alumina in the slurry in an amount greater than the alumina and the amount of methyl cellulose is approximately 10 pounds per ton of kaolin-aluminum oxide mixture.

10. The process of forming a lightweight refractory aggregate consisting of the steps of forming an aqueous slurry of a refractory material from the group consisting of kaolin, kyanite, zircon flour and alumina, generating a foam within the slurry using an anionic surface active agent, adding a thermal gelling agent from the group consisting of methyl cellulose and raw starch to the slurry, heating the slurry to gel the same and firing the gelled slurry.

11. The process of forming a lightweight refractory aggregate consisting of the steps of forming an aqueous slurry of kaolin, foaming said slurry with the addition of a surface active agent, adding raw starch to the foamed slurry, heating said slurry to gel the raw starch and the foam structure in the slurry, and firing the gelled slurry to a temperature of 2400–3000° F.

12. The process of forming a lightweight refractory aggregate consisting of the steps of forming an aqueous slurry of kaolin, generating a foam from a surface active agent in the slurry, adding raw thick boiling starch to the slurry, heating the slurry to gel the same, and firing the resultant gelled mass; the raw starch being added to the foam in an amount of from 2 to 75% based on the kaolin in the slurry.

13. The process of forming a lightweight refractory aggregate consisting of the steps of forming an aqueous slurry of deflocculated clay, generating foam within the slurry through the addition of an anionic surface active agent, adding raw thick boiling starch to the slurry in the range of 3 to 25% based on the clay in the slurry, rapidly heating the foamed slurry to gel said slurry, and firing the gelled slurry to a temperature of approximately 2500° F.

14. The process of forming a lightweight refractory aggregate consisting of the steps of forming an aqueous slurry of flocculated clay, generating a foam within the slurry by the admixture of a surface active agent therein, adding raw thick boiling starch to the slurry in the range of 2 to 25% based on the clay in the slurry, rapidly heating the foamed slurry to gel said slurry, and firing the gelled slurry to a temperature in the range of 2400 to 3000° F.

15. The process of forming a lightweight refractory aggregate consisting of the steps of forming an aqueous slurry of zircon flour, generating a foam within the slurry by adding a surface active agent and agitating the slurry, adding raw thick boiling starch in the amount of approximately 4% based on the zircon flour in the slurry, gelling the slurry by heat, and firing the slurry to a temperature of approximately 2900° F.

16. The process of forming a lightweight refractory aggregate consisting of the steps of forming an aqueous slurry of alumina and bentonite, generating a foam within the slurry by adding an anionic surface active agent to the slurry and agitating, adding raw thick boiling starch to the slurry in an amount of approximately 4% based on the alumina and bentonite, gelling the slurry by heating the raw starch, and firing the gelled slurry to a temperature of approximately 3000° F.

17. The process of forming a lightweight refractory aggregate consisting of the steps of forming an aqueous slurry of kyanite and a small amount of bentonite, generating a foam within the slurry by adding an anionic surface active agent and agitating, adding raw thick boiling starch to the slurry in an amount of approximately 4% based on the total kyanite and bentonite in the slurry, quickly gelling the slurry by the application of heat, and firing the gelled slurry to a temperature of approximately 2900° F.

18. The process of forming a lightweight refractory aggregate consisting of the steps of forming an aqueous slurry of kaolin and alumina, generating a foam within the slurry by agitation of the slurry after the addition of an anionic surface active agent, adding raw thick boiling starch to the slurry in an amount of approximately 6% based on the total of the kaolin and alumina in the slurry, quickly gelling the foamed slurry by heating the slurry to a temperature of approximately 165° F., and firing the gelled slurry to a temperature of approximately 2900° F.

19. A lightweight aggregate consisting essentially of a fired refractory foamed mass, said mass being formed by mixing a substance selected from the group consisting of kaolin, kyanite, zircon and alumina with water and a thermal gelling agent, adding a foaming agent selected from the group consisting of methyl cellulose and raw starch, agitating the mass to obtain a foamed slurry, heating the slurry to gel the foam structure within the slurry, and firing the gelled slurry.

20. A lightweight aggregate consisting essentially of a fired refractory foamed mass, said mass being formed by mixing alumina with water and a thermal gelling agent, adding a foaming agent, agitating the mass to obtain a foamed slurry, heating the slurry to gel the foam within the slurry and firing the gelled slurry; said thermal gelling agent being a raw, uncooked starch.

21. In the process of forming a lightweight aggregate wherein a foam is formed from an aqueous mixture consisting essentially of water, particles of refractory material, a foaming agent, and a gelling agent, and the foam fired to form a refractory aggregate; the improvement consisting of heating the foam having therein a thermal gelling agent from the group consisting of methyl cellulose and raw starch to form a gel, and firing the gelled mass.

22. The process of forming a lightweight refractory aggregate consisting essentially of forming a foam from an aqueous slurry of a refractory material from the group consisting of kaolin, kyanite, zircon flour, and alumina; an anionic surface active agent, and a thermal gelling agent from the group consisting of methyl cellulose and raw starch, heating said foamed slurry to form a gel, and firing the gelled slurry.

23. The process of forming a lightweight aggregate which consists of forming an aqueous slurry of a refractory material from the group consisting of kaolin, kyanite, zircon flour, and alumina; an anionic surface active agent, and a thermal gelling agent from the group consisting of methyl cellulose and raw starch, foaming said slurry, heating said foamed slurry to form a gel, and firing the gelled slurry.

24. The process of claim 21 wherein the thermal gelling agent is raw starch.

25. The process of claim 21 wherein the thermal gelling agent is methyl cellulose.

26. A lightweight aggregate obtained by the process of claim 21.

References Cited in the file of this patent

UNITED STATES PATENTS

| | | |
|---|---|---|
| 1,937,472 | Ericson | Nov. 28, 1933 |
| 1,998,686 | Parsons | Apr. 23, 1935 |
| 2,004,686 | Birchy | June 11, 1935 |
| 2,007,053 | Howe | July 2, 1935 |
| 2,235,881 | France | Mar. 25, 1941 |
| 2,240,963 | Swezey | May 6, 1941 |
| 2,292,011 | Parsons | Aug. 4, 1942 |
| 2,364,317 | Schaefer | Dec. 5, 1944 |
| 2,543,987 | Ramsay | Mar. 6, 1951 |
| 2,689,184 | Grossi | Sept. 14, 1954 |
| 2,875,555 | Thiegs | Mar. 3, 1959 |
| 2,922,719 | Robinson | Jan. 26, 1960 |
| 2,970,060 | Burnett | Jan. 31, 1961 |
| 2,970,061 | Burnett | Jan. 31, 1961 |
| 3,041,190 | Griffith et al. | June 26, 1962 |

FOREIGN PATENTS

| | | |
|---|---|---|
| 539,022 | Great Britain | Aug. 25, 1941 |

OTHER REFERENCES

Solovev: "Brick With Lightweight Filler," Karamika, No. 2 (1939), pages 16–17.